US005119844A

United States Patent [19]

Cannon et al.

[11] Patent Number: 5,119,844

[45] Date of Patent: Jun. 9, 1992

[54] AIR TANK CONVERSION KIT

[76] Inventors: Reuben C. Cannon; Elizabeth M. Cannon, both of Rte. 2, Box 242, Mize, Miss. 39116

[21] Appl. No.: 790,821

[22] Filed: Nov. 12, 1991

[51] Int. Cl.[5] ............................................ F16K 37/28

[52] U.S. Cl. ............................... 137/382; 137/355.16; 137/557; 137/597

[58] Field of Search ........... 137/557, 377, 382, 355.16, 137/597

[56] References Cited

U.S. PATENT DOCUMENTS

| | | | |
|---|---|---|---|
| 1,767,337 | 6/1930 | Wilson | 137/382 |
| 2,454,934 | 11/1948 | Mathias | 137/377 |
| 2,945,294 | 7/1960 | Courtof et al. | 137/382 |
| 2,964,054 | 12/1960 | Weatherhead, Jr. | 137/382 |
| 3,964,508 | 6/1976 | Miller | 137/377 |
| 4,215,581 | 8/1980 | Bolick et al. | 137/382 |
| 4,600,033 | 7/1986 | Baron | 137/382 |
| 5,058,758 | 10/1991 | Suddeth | 137/382 |

*Primary Examiner*—A. Michael Chambers
*Attorney, Agent, or Firm*—Leon Gilden

[57] ABSTRACT

A conversion kit is utilized in combination with an air tank for containing pressurized air to include a series of inner communicating fittings mounted to a primary distribution block for utilization of the container as a transportable source of pressurized air. A modification of the invention includes the kit structure in cooperation with a cage organization to afford protection to the pressurized container minimizing damage thereto.

4 Claims, 4 Drawing Sheets

FIG. 3
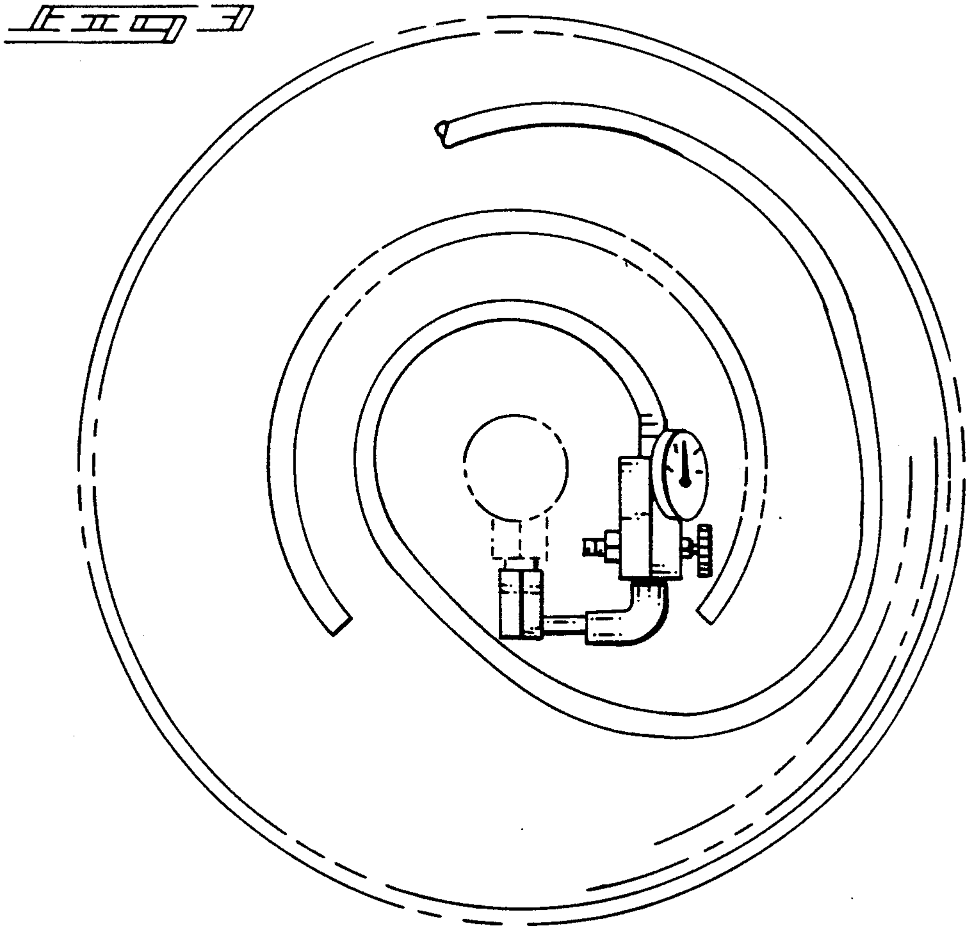
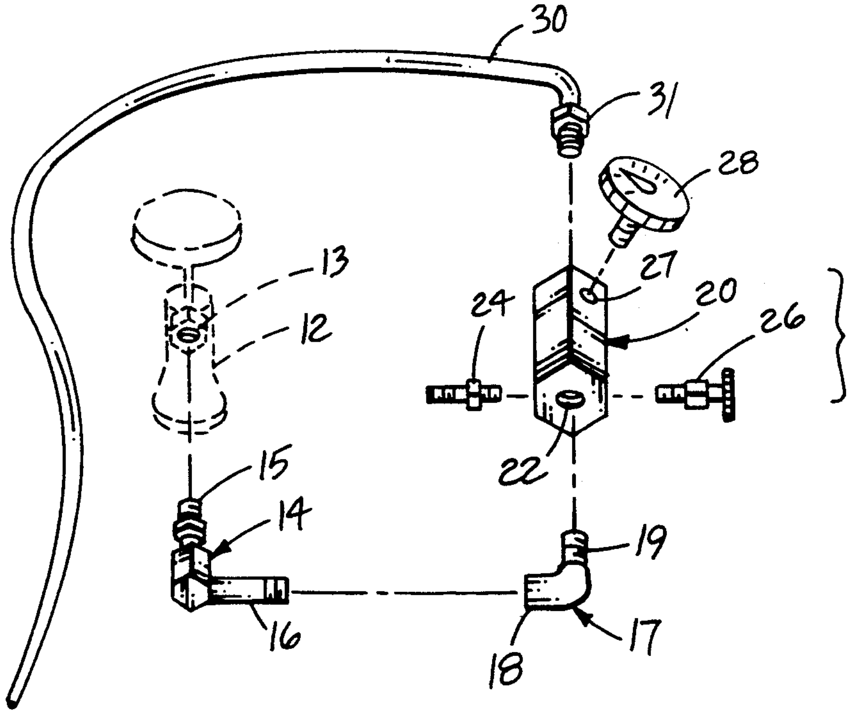
FIG. 4

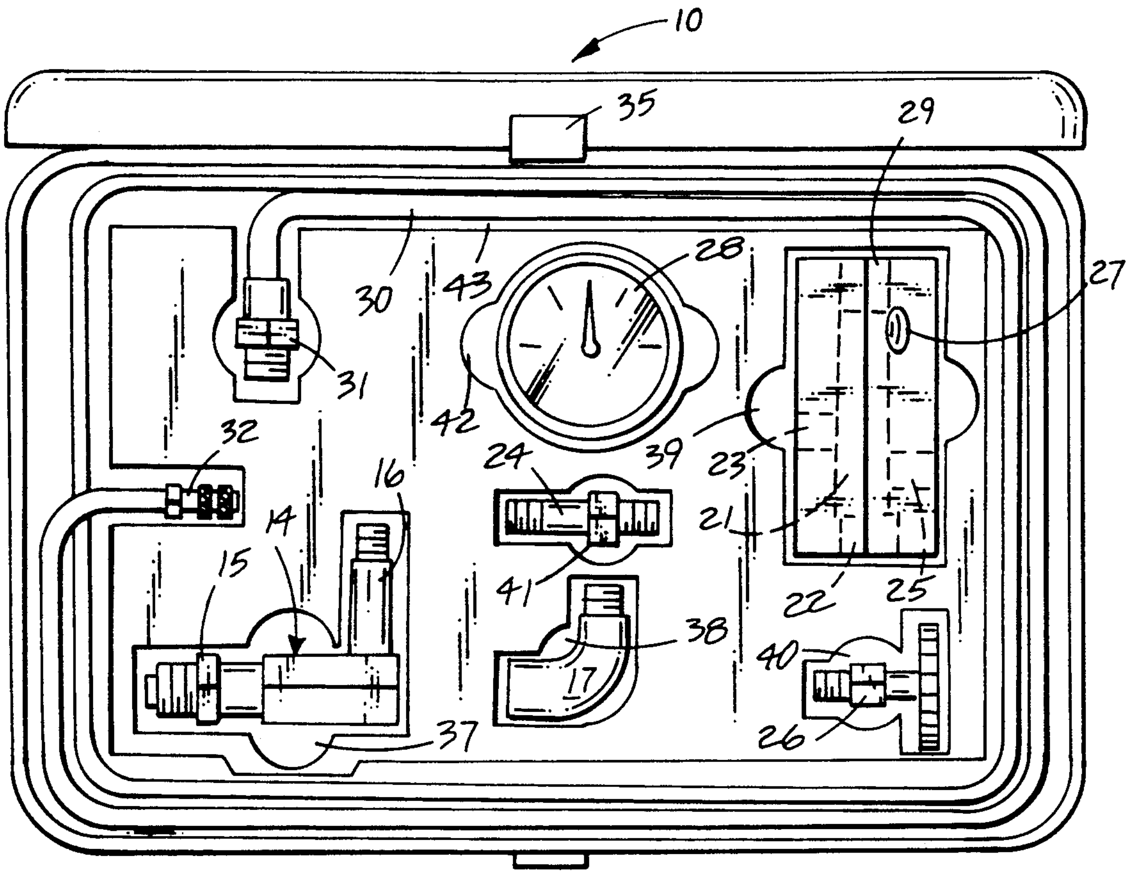
Fig 5
Fig 6
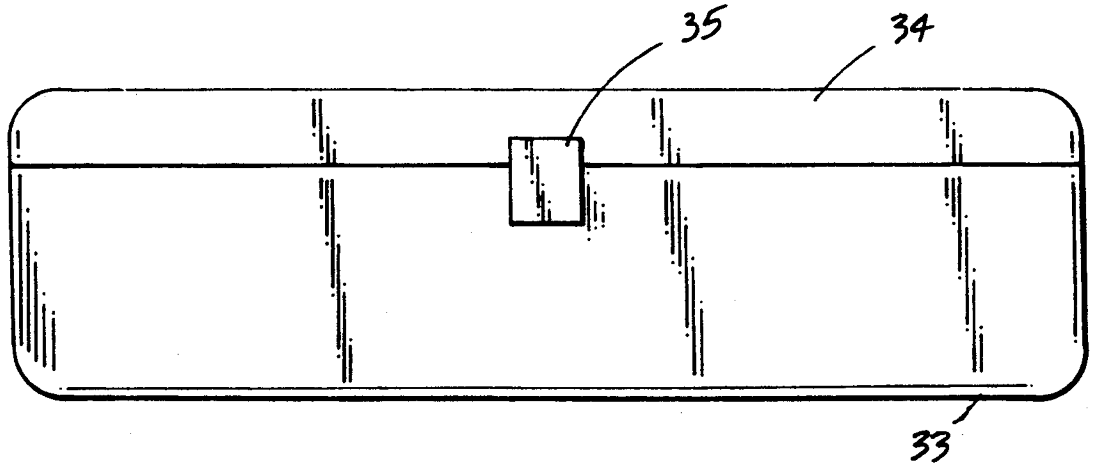

AIR TANK CONVERSION KIT

BACKGROUND OF THE INVENTION

1. Field of the Invention

The field of invention relates to pressurized air apparatus, and more particularly pertains to a new and improved air tank conversion kit wherein the same permits utilization of pressurized containers for subsequent use as transportable pressurized air sources.

2. Description of the Prior Art

Various manifold devices and the like have been utilized for mounting to compressed air tanks for delivery of pressurized air. Such apparatus is exemplified in the U.S. Pat. Nos. 4,768,550; 4,120,319; and 4,616,677. A portable compressed air delivery unit available in the prior art utilizing an air compressor for transportation within a wheeled transport housing is set forth in U.S. Pat. No. 4,798,233 to Mooney.

Accordingly, it may be appreciated that there continues to be a need for a new and improved air tank conversion kit as set forth by the instant invention which addresses both the problems of ease of use as well as effectiveness in construction in providing an organization for the utilization of a pressurized container tank for subsequent use in the filling and for subsequent release of pressurized air therefrom.

SUMMARY OF THE INVENTION

In view of the foregoing disadvantages inherent in the known types of air container apparatus now present in the prior art, the present invention provides an air tank conversion kit wherein the same is arranged to provide for a manifold structure and associated conduit organization for the utilization of a pressurized tank for the containment and selective release of pressurized air therefrom. As such, the general purpose of the present invention, which will be described subsequently in greater detail, is to provide a new and improved air tank conversion kit which has all the advantages of the prior art air tank apparatus and none of the disadvantages.

To attain this, the present invention provides a conversion kit utilized in combination with an air tank for containing pressurized air to include a series of inner communicating fittings mounted to a primary distribution block for utilization of the container as a transportable source of pressurized air. A modification of the invention includes the kit structure in cooperation with a cage organization to afford protection to the pressurized container minimizing damage thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved air tank conversion kit which has all the advantages of the prior art air tank apparatus and none of the disadvantages.

It is another object of the present invention to provide a new and improved air tank conversion kit which may be easily and efficiently manufactured and marketed.

It is a further object of the present invention to provide a new and improved air tank conversion kit which is of a durable and reliable construction.

An even further object of the present invention is to provide a new and improved air tank conversion kit which is susceptible of a low cost of manufacture with regard to both materials and labor, and which accordingly is then susceptible of low prices of sale to the consuming public, thereby making such air tank conversion kits economically available to the buying public.

Still yet another object of the present invention is to provide a new and improved air tank conversion kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2 in the direction indicated by the arrows.

FIG. 4 is an isometric exploded illustration of the various inter-fitting conduits utilized by the instant invention.

FIG. 5 is an isometric illustration of the container housing kit utilized by the instant invention.

FIG. 6 is an orthographic end view of the container in a closed configuration.

DESCRIPTION OF THE PREFERRED EMBODIMENT

Figure 1:
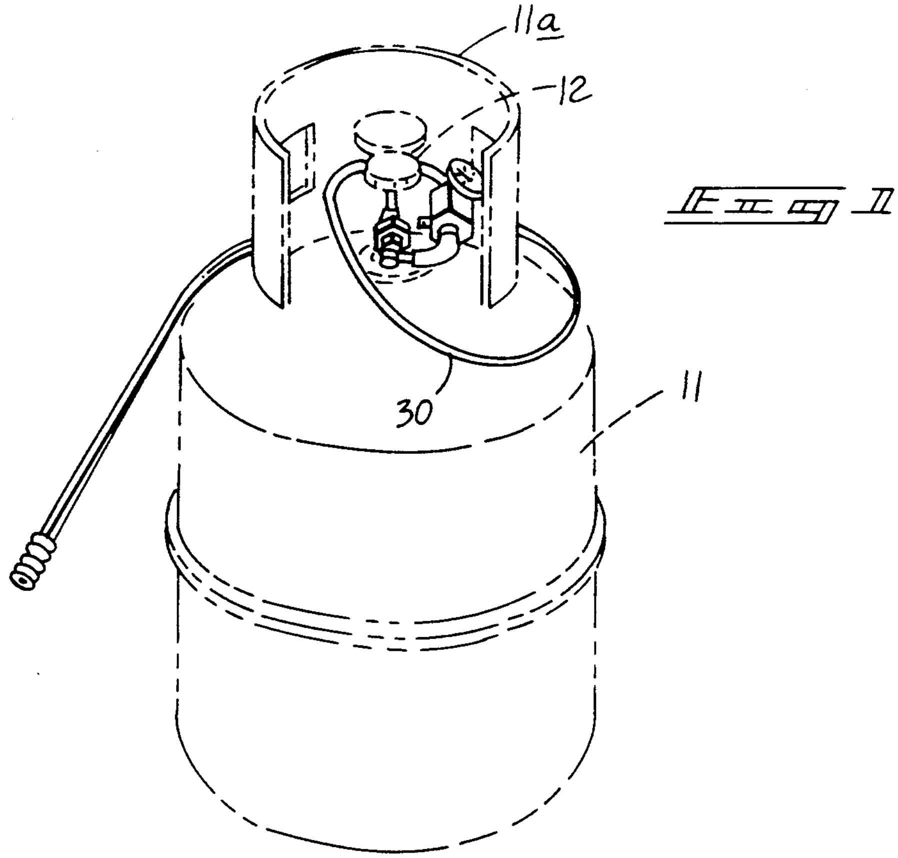
FIG. 1 is an isometric illustration of the instant invention mounted to an associated air tank member.
Figure 2:
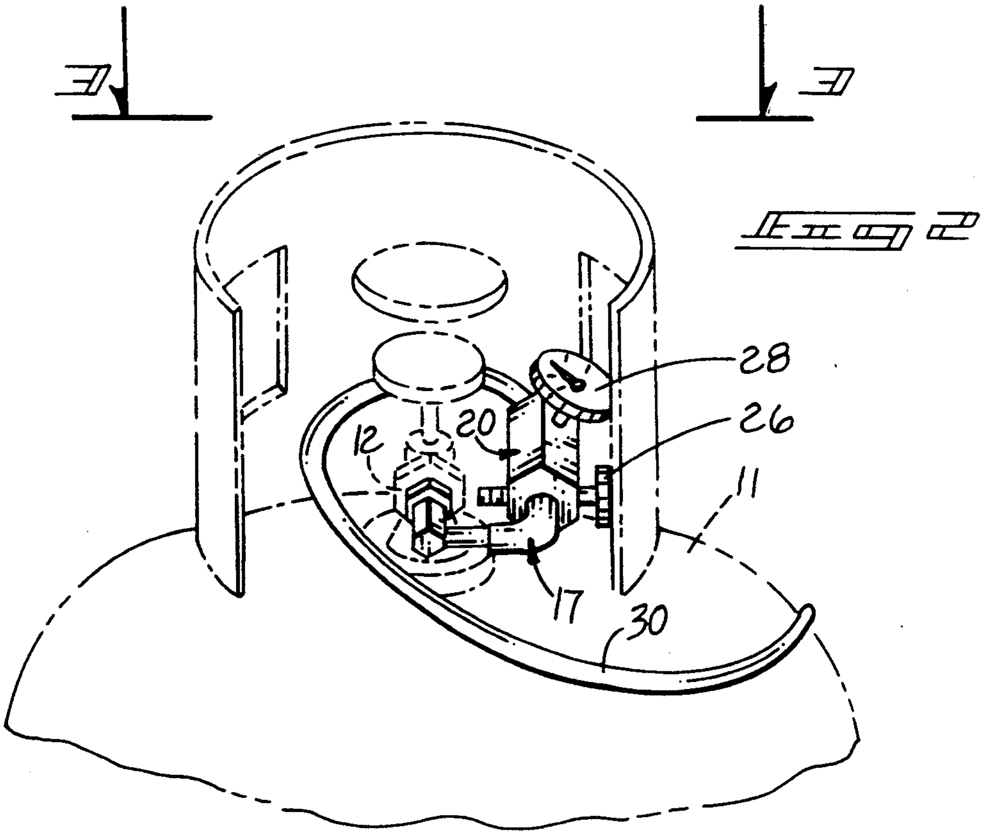
FIG. 2 is an enlarged isometric illustration of the invention as set forth in FIG. 1.

With reference now to the drawings, and in particular to FIGS. 1 to 8 thereof, a new and improved air tank conversion kit embodying the principles and concepts of the present invention and generally designated by the reference numeral 10 will be described.

More specifically, the air tank conversion kit 10 of the instant invention essentially comprises the use of a pressurized tank 11 in combination with a pressurized tank valve 12 mounted in communication with the interior defined cavity of the pressurized tank 11 to permit selective air flow therethrough. The tank valve 12 includes a valve threaded bore 13, typically of a left-hand thread, arranged to receive an "L" shaped first fitting 14 to include a left-hand externally threaded first conduit 15 received within the valve threaded bore 13. A second conduit 16 in pneumatic communication with the first conduit is received within a third conduit 18 and in turn directs pneumatic pressure into a fourth conduit 19, wherein the third and fourth conduits 18 and 19 define a second fitting 17. The first and second "L" shaped fittings 14 and 17 respectively permit arrangement and orientation of an associated distribution block 20 in adjacency relative to the pressurized tank valve 12 to permit positioning of the organization within the pressurized tank fence 11*a* that is mounted in surrounding relationship relative to the pressurized tank valve 12. The distribution block 20 includes a central conduit 21 directed therethrough, including a first receiving socket 22 arranged to receive the fourth conduit 19 in threaded inner communication. A second receiving socket 23 (see FIG. 5 and FIG. 4) is arranged to receive a Schrader fill valve 24 to permit ease of selective filling of the pressurized tank 11 through the tank valve 12. A third receiving socket 25 receives a pressure release valve 26 preset to permit excess pressure to be diverted from the tank and directed exteriorly thereof to eliminate hazard in the use of the tank structure. A fourth receiving socket 27 includes a pressure gauge 28 for providing individual indication of pressure within the tank and conduit structure, with a flexible delivery fifth conduit 30 including a conduit first fitting 31 arranged for reception within the fifth receiving socket 29. The first, second, third, fourth, and fifth receiving sockets of the distribution block 20 are each in pneumatic communication with the central conduit 21, as illustrated in the FIG. 5 for example. The conduit second fitting 32 is formed of structure to provide for filling of pneumatic tires, using a coupling for operation of an air tool and the like.

The FIGS. 5 and 6 illustrate the use of a support case 33, including a lid 34, including a latch 35 to selectively secure the lid 34 to the case 33. A respective first, second, third, fourth, fifth, sixth, and seventh cavity 37, 38, 39, 40, 41, 42, and 43 are formed within a floor plate of the case 33 to receive the components 14, 17, 39, 26, 24, 28, and 30 of the organization.

Figure 7:
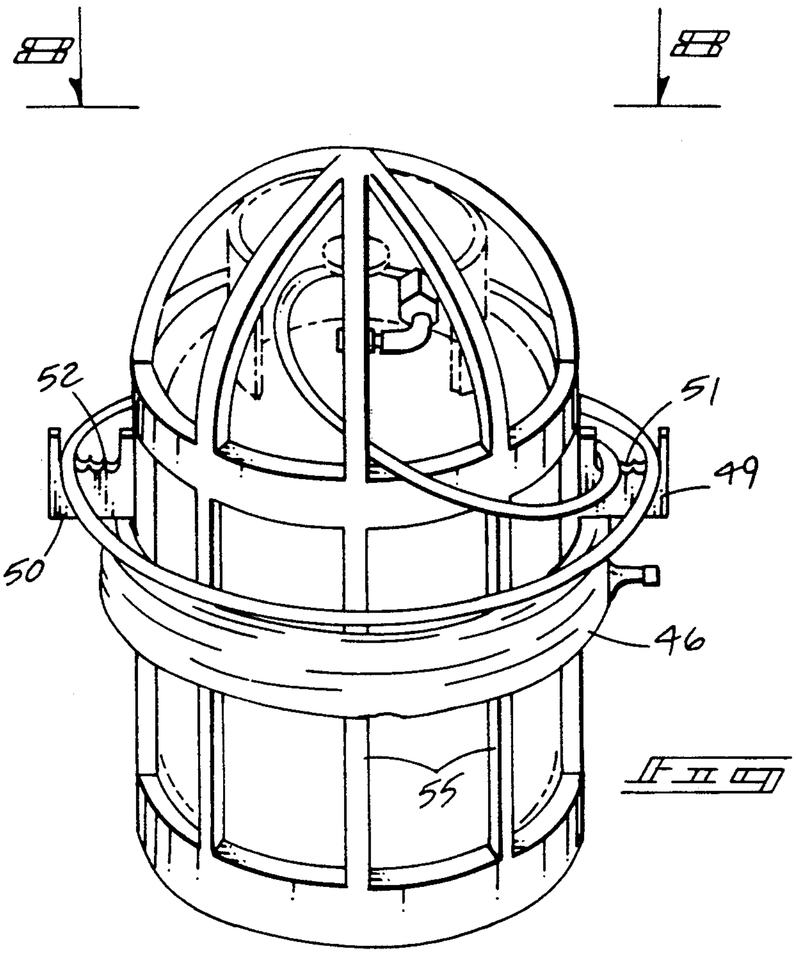
FIG. 7 is an isometric illustration of the invention utilizing a protective cage.
Figure 8:
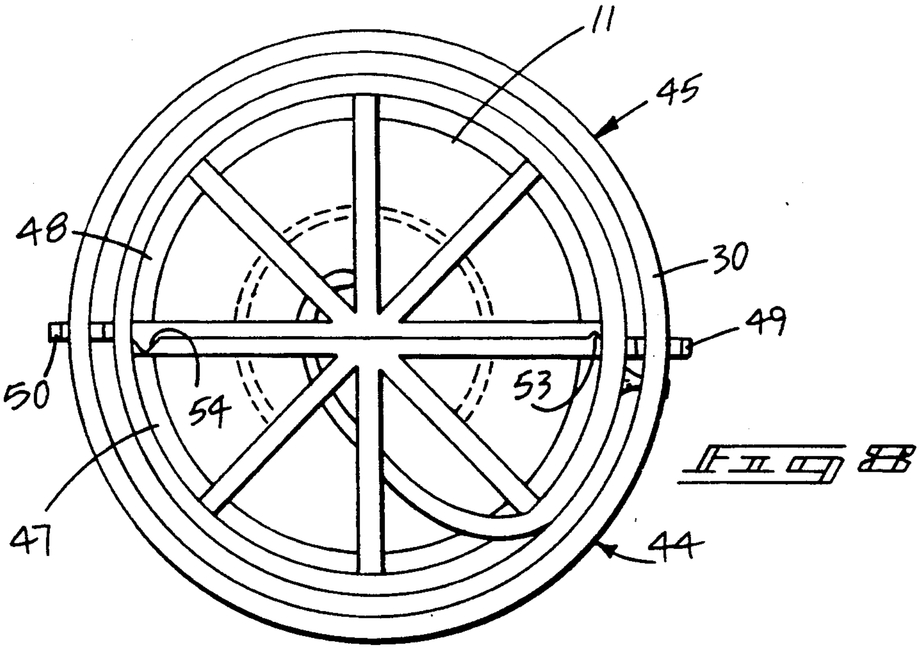
FIG. 8 is an orthographic view, taken along the lines 8—8 of FIG. 7 in the direction indicated by the arrows.

The FIGS. 7 and 8 illustrate the use of a protective cage in surrounding relationship relative to the tank and conduit structure, wherein the cage includes a series of spaced parallel cage slats 55 arranged in a spaced relationship to permit access to the tank valve 12, as well as the various components such as the fill valve 24 and the like. Further, visual observation of the various components is available. A first cage shaft 44 interfits with a second cage shaft 45 utilizing interfitting ribs 53 and recesses 54 formed within the first and second cage halves 44 and 45. A first cage floor 47 is coplanar with a second cage floor 48 for positioning the tank 11 thereon. A circumferential inflation bladder 46 is positioned in surrounding relationship relative to the first and second cage halves 44 and 45 to secure the cage halves together and further afford impact protection relative to the organization in use. A first "U" shaped hose support 49 is diametrically mounted in opposed relationship relative to a second "U" shaped hose support 50 secured to the respective first and second cage halves 44 and 45, wherein the first and second hose supports 49 and 50 include respective first and second ribbed floors 51 and 52 to receive the hose in a spaced relationship when coiled about the first and second cage halves in the use of an elongate hose structure.

It should be further noted that the circumferential inflation bladder is provided with an inflation bladder valve to afford selective inflation of the inflation bladder to provide desired securement and engagement of the first cage half and the second cage half together in a secured relationship.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air tank conversion kit in combination with an air tank, wherein the tank includes a tank valve, and the tank further includes a tank fence fixedly mounted to the tank extending in a generally surrounding relationship relative to the tank valve, and an "L" shaped first fitting defining a first conduit received within the tank valve, and the first fitting including a second conduit orthogonally oriented relative to the first conduit in pneumatic communication therewith, and the second conduit received within a second fitting, wherein the second fitting includes a third conduit receiving the second conduit, and a fourth conduit orthogonally oriented relative to the third conduit, and a distribution block, the distribution block including a central conduit directed therethrough, and including a first receiving socket receiving the fourth conduit therewithin, and a second socket directed into the distribution block in pneumatic communication with the central conduit receiving a pneumatic fill valve, and the distribution block including a third receiving socket including a pressure release valve in pneumatic communication with the central conduit, and a fourth receiving socket directed into the distribution block in pneumatic communication with the central conduit, including a pressure gauge, and a fifth receiving conduit directed into the distribution block, and a flexible delivery conduit including a first fitting, with the first fitting received within the fifth receiving socket, and a free distal end of the flexible delivery conduit including a second fitting for distribution of pressurized air therethrough, and the distribution block is arranged in adjacency relative to the tank valve within the fence.

2. An apparatus as set forth in claim 1 including a cage member arranged in surrounding relationship relative to the pressurized tank, wherein the cage member includes a first cage half secured to a second cage half, wherein the first cage half includes a plurality of first projecting ribs and first receiving recesses, and the second cage half includes a plurality of second projecting ribs and second receiving recesses, wherein the first projecting ribs are received within the second receiving recesses, and the first receiving recesses receive the second projecting ribs therewithin, and the first cage half and the second cage half include respective first cage floor and a second cage floor arranged in a coplanar relationship to receive the tank thereon, and the cage arranged in surrounding relationship relative to the tank extending upwardly and above the tank, wherein the first cage half and the second cage half each include spaced parallel cage slats providing access therethrough to the tank valve and the distribution block.

3. An apparatus as set forth in claim 2 wherein the first cage half includes a first "U" shaped hose support and the second cage half includes a second "U" shaped hose support, the first "U" shaped hose support includes a first ribbed floor and the second "U" shaped hose support includes a second ribbed floor, wherein the first ribbed floor and the second ribbed floor receive the flexible delivery conduit thereon in a wound relationship for storage of the flexible delivery conduit.

4. An apparatus as set forth in claim 3 including a circumferential inflation bladder arranged in surrounding relationship relative to the first cage half and the second cage half to secure the first cage half and the second cage half together and afford impact protection to the first cage half and the second cage half, and the circumferential inflation bladder includes an inflation bladder valve to effect selective inflation of the inflation bladder.

* * * * *